April 19, 1927.
I. L. ROSENTHAL
1,625,746
METHOD OF AND DEVICE FOR PREVENTING THE SKIDDING
OF SELF PROPELLED ROAD VEHICLES
Filed Jan. 2, 1926
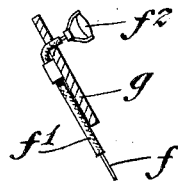
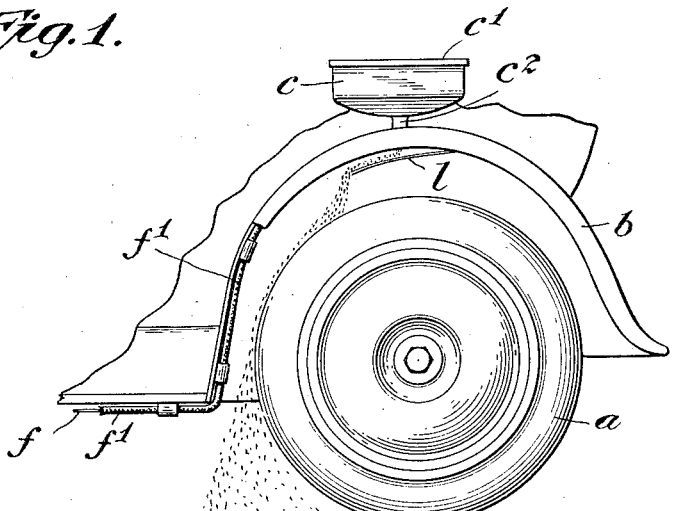
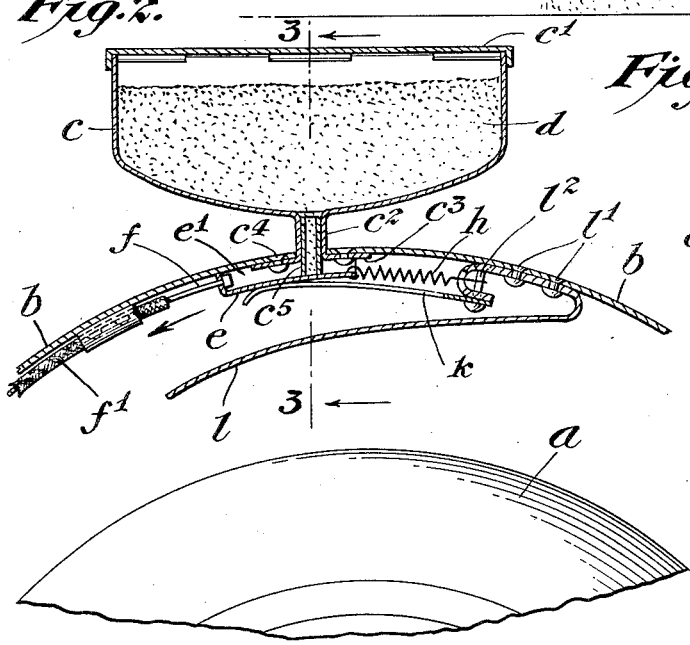
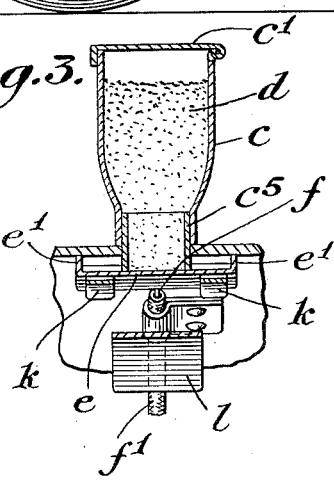
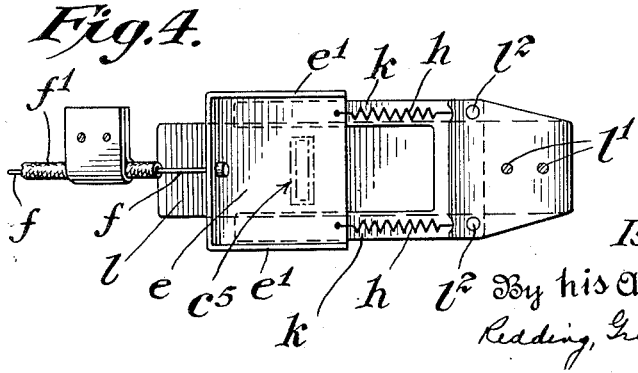
Inventor
Isadore L. Rosenthal
By his Attorneys
Redding, Greeley, O'Shea & Campbell Patented Apr. 19, 1927.

1,625,746

UNITED STATES PATENT OFFICE.

ISADORE L. ROSENTHAL, OF BROOKLYN, NEW YORK, ASSIGNOR TO JULIA ROSENTHAL, OF BROOKLYN, NEW YORK.

METHOD OF AND DEVICE FOR PREVENTING THE SKIDDING OF SELF-PROPELLED ROAD VEHICLES.

Application filed January 2, 1926. Serial No. 78,735.

Numerous mechanical expedients have been devised to reduce the skidding of road vehicles and increase the tractive effort of the wheels but so far as is known these expedients have never met the requirements in a simple and effective manner which might be made universally available. The present method approaches the problem from a different angle in that it is proposed to increase, when required, the degree of friction between the road wheel and the load, not by mechanical devices but by a suitable friction composition which may be applied at the will of the operator to the surface of the wheel from whence it is carried to the surface of the ground. Aside from the broad object of the invention which has to do with the provision of an improved method for reducing skidding, a primary object is to provide suitable means for applying the friction material to the wheel which means shall be of simple and compact form, inexpensive for attachment to cars and capable of permanent incorporation, if desired, during the production of the vehicle. In the accompanying drawings there is illustrated a suitable embodiment of such means capable of being marketed and attached readily to cars of any standard make but it will be understood as the description proceeds that the embodiment illustrated is given merely by way of example and changes in such means will suggest themselves to skilled mechanics without departing from the spirit of the invention. In accordance with the means illustrated there is provided a container for a friction material which may be readily filled when necessary by the operator. This container is mounted on any convenient part of the vehicle, preferably in proximity to one of the driving wheels, although it is evident that duplicate containers under a single control may be provided for as many wheels as desired. The discharge of the material from the container is controlled by the operator through a suitable valve and a baffle is provided to direct the material onto the surface of the wheel in such quantities and for such duration of time as may be necessary to meet the skidding condition. The valve by which this control is accomplished may be connected by flexible cable or similar operating means to a handle within easy reach of the driver.

Reference is now to be had to the accompanying drawings for a detailed description of the preferred embodiment by which the method is practiced. In these drawings:

Figure 1 is a view in side elevation of a fragment of an automobile having one of the improved devices mounted in operative relation to one of the drive wheels thereof.

Figure 2 is a view in longitudinal section through the mud guard and container shown in Figure 1.

Figure 3 is a view in transverse section through the container and mud guard and taken on the plane indicated by the line 3—3 of Figure 2 and looking in the direction of the arrows.

Figure 4 is a detailed view in plan showing the valve control and baffle for the friction material, the parts being removed from the mud guard.

As indicated hereinbefore the device may be applied to any one or more of the wheels of a road vehicle and may be manufactured and sold as an attachment which can be readily assembled in place on any vehicle or it may be built in as standard production during the manufacture of the vehicle. The invention is not to be limited to the character of the friction material used.

The driving wheel $a$ of an automobile is shown as having in usual relation thereto the mud guard $b$ on which is supported a container $c$ for a friction material indicated generally at $d$. The top $c'$ of the container may be readily removed to replenish the material. In assembling the lower walls of the container $c$ are shown as converging and forming a discharge passage $c^2$ at the bottom, these walls being extended through an opening in the mud guard and bent under in opposite directions as indicated at $c^3$ to be riveted as at $c^4$ or otherwise secured to the mud guard. Within the discharge passage thus formed may be placed an extended spout $c^5$ through which the material passes, the lower end of this spout being closed by a slidable plate $e$ constituting a valve. Flanges $e'$ on three sides of the plate $e$ bear on the underside of the mud guard and guide the plate in its travel so that when it is pulled out of line with the discharge spout $c^5$ the material may fall freely but the plate may be restored to close the valve when sufficient material has been used. Operating means for the valve may be either manual or power, manual means being illustrated in the embodiment in the form of a flexible cable $f$ which may be led through a suitable conduit $f'$ to the dash $g$ of the vehicle where the cable terminates in a suitable handle $f^2$ to facilitate the application of force thereto by the driver to open the valve. Suitable springs $h$ on the other side of the valve and anchored to the mud guard serve to close the valve when the operator releases the handle $f^2$. Additional leaf springs $k$ may be carried with the mud guard or any bracket thereon and engage the underside of the valve plate to hold it snugly in position on the under-surface of the mud guard and on the mouth of the spout $c^5$ during its reciprocation. A baffle plate $l$ of suitable form, preferably curved downwardly is also mounted on the mud guards as by rivets $l'$ and extends under the valve plate $e$ and the mouth of the spout $c^5$ in such relation to the parts that when the plate is drawn away from the mouth of the spout the friction material $d$ will fall directly on the baffle $l$ from whence it will be directed, as indicated in Figure 1, to the surface of the wheel $a$. Naturally it will be desirable to have the friction material applied on the forward side of the wheel so that such part as may not adhere thereto will shower onto the ground to increase the friction on the driving surface. As a structural detail making for simplification, it will be observed that the baffle plate $l$ is so formed as to support studs $l^2$ which secure the leaf springs $k$ in place and serve additionally as anchorages for the springs $h$.

The operation of the mechanism will be evident from the description given and some of the possible modifications have been indicated. The method itself consists in applying friction material directed to the surface of a wheel of a road vehicle from whence it is carried into engagement from the road surface to prevent skidding and increase tractive effort. As a characteristic of this method the friction material is preferably applied at the upper portion of the wheel and in controllable quantities from a container therefor carried in proximity to the wheel.

What I claim is:

1. Devices of the character described comprising a container for friction material mounted on the mud guard in proximity to a road wheel, a discharge spout from the container, a valve mounted on the underside of the mud guard and controlling the discharge spout, means to operate the valve from the driver's seat and a baffle independent of the valve to direct the friction material from the spout onto the tread of the road wheel.

2. Devices of the character described comprising a container for friction material mounted on the mud guard and having flanges secured thereto, a discharge spout for the material, a valve plate slidable along the under-surface of the mud guard and disposed in operative relation to the spout to control the escape of material therefrom, spring means to resist yieldingly movement of the valve, a flexible cable secured to the valve and provided with means at the operator's seat for the application of force thereto, means to guide the valve in its movements and a curved baffle on which the material is discharged, said baffle directing the material to the tread of a road wheel.

3. Devices of the character described comprising a container for friction material mounted on the mud guard of a road vehicle and having a discharge spout, a slide valve to control the escape of material through the spout, a baffle to direct the discharged material onto the tread of the wheel, means to secure the baffle to the mud guard, spring means mounted with the baffle to support the slide valve, devices to secure said last named spring means to the baffle, springs operatively engaged with the valve and with said last named securing means.

This specification signed this 31st day of December, A. D. 1925.

ISADORE L. ROSENTHAL.